United States Patent [19]

Meuer et al.

[11] Patent Number: 4,967,881
[45] Date of Patent: Nov. 6, 1990

[54] CENTRAL LUBRICATING INSTALLATION

[75] Inventors: Johannes Meuer; Christian Nemack; Raimond Stockhammer; Dieter Todtenhaupt, all of Berlin, Fed. Rep. of Germany

[73] Assignee: Willy Vogel Aktiengesellschaft, Berlin, Fed. Rep. of Germany

[21] Appl. No.: 473,234

[22] Filed: Jan. 31, 1990

[30] Foreign Application Priority Data

Feb. 16, 1989 [DE] Fed. Rep. of Germany ....... 3904952

[51] Int. Cl.[5] ............................................. F16N 27/00
[52] U.S. Cl. ..................................... 184/7.4; 184/6.4; 184/7.3
[58] Field of Search ................... 184/6.1, 6.4, 7.4, 108, 184/7.2, 7.3

[56] References Cited

U.S. PATENT DOCUMENTS 4,520,902 6/1985 Snow ...................................... 184/7.4
4,527,661 7/1985 Johnstone et al. ................... 184/6.1
4,633,976 1/1987 Waki et al. ........................... 184/6.4

*Primary Examiner*—Stephen F. Husar
*Assistant Examiner*—Alan B. Cariaso
*Attorney, Agent, or Firm*—Mark P. Stone

[57] ABSTRACT

In a central lubricating installation which is primarily intended for commercial vehicles the running time of the pump unit (2) supplying lubricant to the lubricant distributors (6, 7) is controlled as a function of the ambient temperature, determined by means of a temperature sensor (23).

10 Claims, 1 Drawing Sheet

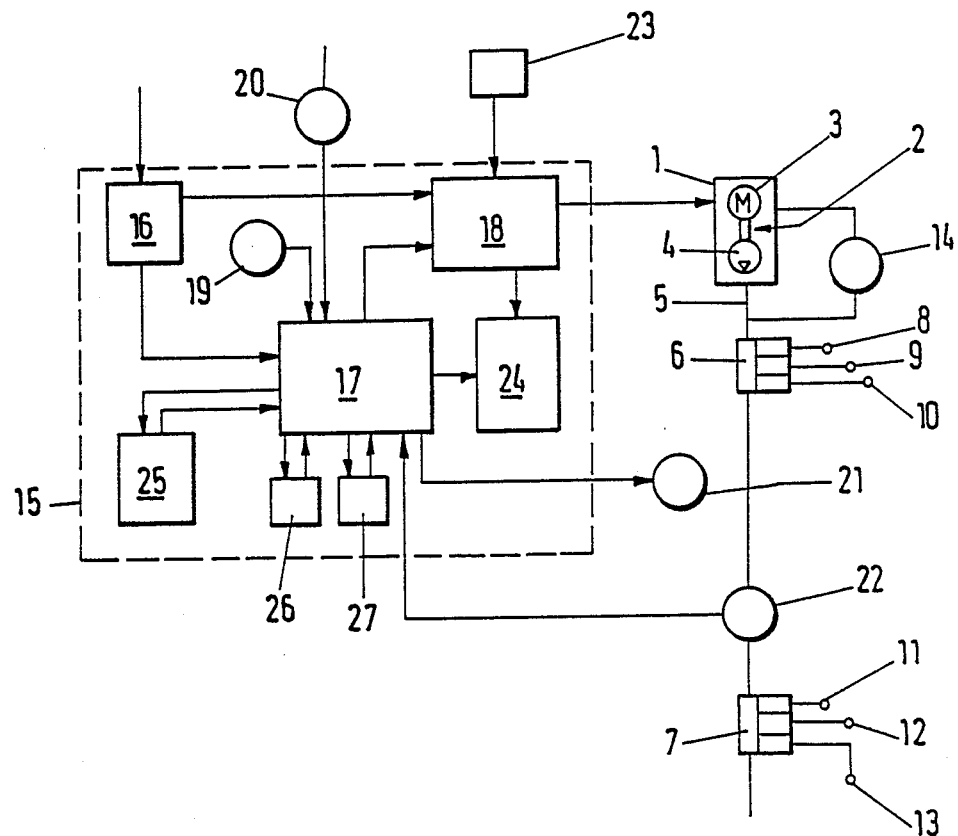

CENTRAL LUBRICATING INSTALLATION

BACKGROUND OF THE INVENTION

The invention relates to a central lubricating installation, in particular for commercial vehicles, comprising a lubricant reservoir, a pump unit, a control device controlling interval and running times of the pump unit, a pressure sensor interacting with the control device and monitoring the satisfactory operation of the installation, a pressure limiting valve, and also lubricant lines through which lubricating grease can be delivered to lubricant distributors allocated to lubricating points which are at different distances from the pump unit.

Central lubricating installations of the above type are being increasingly fitted in particular in modern commercial vehicles. They are regularly conceived as consumption lubricating installations and are equipped with so-called single-line distributors according to DIN 24271. The control device of the respective installation drives its pump unit at certain time intervals, which can be set by the user, in order to press lubricating grease into the lubricant lines In the process, metering pistons of lubricant distributors, designed in a conventional manner as post-lubricating distributors, are pressurized by a lubricating volume corresponding to their metering size, i.e. they are displaced against the force of a spring in a cylinder allocated to them. As soon as the metering pistons of all distributors are pressurized and a certain value of the pressure in the lubricant line is reached, the pressure sensor signals satisfactory operation of the installation to the control device. In order to obtain an adequate supply to the lubricant distributors even at low temperatures, the pump unit in the known installations works during a firmly preset, comparatively long time, the lubricant quantity which exceeds the receiving capacity of the lubricant distributors during this running time passing back into the lubricant reservoir via the pressure limiting valve after reaching a pressure higher than the response pressure of the pressure sensor. After the pump running time has expired, the pressure in the distribution system is reduced by a relief valve down to a residual pressure, and the lubricating grease is delivered to the lubricating points by the distributor metering pistons, which are under the effect of the spring force.

SUMMARY OF THE INVENTION

Owing to the fact that the pump running time is constant in the known central lubricating installations, and in fact is sufficiently long to enable an adequate supply to the lubricating points even in winter operation, the pump units are in use for a longer time than would be necessary, for example, during purely summer operation. The object of the invention is to reduce the actual working time of relevant pump units for predetermined periods in service of the vehicle or other appliance equipped with a central lubricating installation. The problem highlighted is solved according to the invention when an ambient temperature sensor is allocated to the control device, the signals of which sensor are used to change the running time of the pump unit as a function of the ambient temperature and of the penetration behaviour of the lubricating grease in the sense that the running time is decreased as ambient temperature increases.

In view of the fact that in vehicles, which constitute the main field of application of installations according to the invention, about 90% of all greasing cases occur in temperature ranges in which the penetration capacity of the lubricating grease permits short running times of the pump unit, the wear of the pump is noticeably reduced by the invention and the useful life of the pump unit is clearly increased In addition, in the event of a fracture in the main line of the installation during summer operation, only exceptionally small quantities of lubricant will pass unused into the environment on account of the shortened pump running time here.

It proves to be particularly advantageous when the control device is provided with a control member which, in the presence of low ambient temperatures and a longer running time of the pump unit resulting therefrom, reduces the delivery flow of the pump. In this way, the lubricating grease in the lines connecting the pump unit to the lubricant distributors is set under pressure more slowly than in normal operation and in fact only when all metering pistons of the lubricant distributors are pressurized and the pressure in the installation reaches a value which leads to the response of the pressure sensor and after a further rise in pressure allows the pressure limiting valve to become effective. Thus, a premature response of the pressure sensor, signalling satisfactory operation of the installation, is prevented from occurring at low ambient temperatures as a result of poor penetration behaviour of the lubricating grease, and in addition the lubricant quantity delivered is prevented from passing back into the reservoir via the pressure limiting valve as a result of the further increase in pressure before lubricant distributors at a considerable distance away are fully or even only partly supplied with lubricant. The reduction in the delivery flow, i.e. the lubricant quantity delivered per unit of time, should at the same time be accompanied by a slight increase in the running time of the pump unit.

BRIEF DESCRIPTION OF THE DRAWINGS

A preferred embodiment of the invention is described in greater detail below, with reference to the circuit diagram shown in the single drawing figure.

DESCRIPTION FOR THE BEST MODES OF CARRYING OUT THE INVENTION

In the single drawing FIGURE, 1 is a lubricant reservoir filled with a fluid grease and having a pump unit 2 which has a drive motor 3 and a pump 4. The pump 4 of the pump unit is connected via a main line 5 to a plurality of series-connected lubricant distributors designed as post-lubricating distributors, of which two lubricant distributors 6 and 7 are shown. The lubricant distributors undertake the distribution of metered lubricant quantities to various lubricating points 8 to 13, the lubricant being delivered only after the pump run is complete and the main line 5 is relieved under the force of so- called pre-loaded springs acting on metering pistons of the lubricant distributors.

14 is a pressure limiting valve via which excess lubricating grease delivered during the running time of the pump unit 2 passes back into the lubricant reservoir 1 after all lubricant distributors are filled.

Serving to control the installation is a control device 15 having a supply unit 16 to which, when fitted into a commercial vehicle, voltage is applied when the ignition is switched on. The supply unit 16 feeds a microprocessor 17 and a power unit 18. Attached to the microprocessor 17 are an interval selector 19 and a pushbutton switch 20 for intermediate lubrication and the cancelling of any fault messages which are indicated by a signal lamp 21 if sufficiently high pressure, monitored by a pressure sensor 22, does not appear in the main line 5.

An ambient temperature sensor 23 is connected to the power unit 18, the signals of which sensor 23 pass to the microprocessor 17 via an analogue-to-digital converter 24. In the microprocessor 17, the signals are compared with data stored in a memory 25 and the running time of the drive motor 3 is established in accordance with the ambient temperature determined. The data stored in the memory 25 is obtained on the basis of test series with which pump running times are determined as a function of the lubricating grease used in each case, which pump running times guarantee satisfactory greasing at the respective ambient temperatures.

The pressure sensor 22 is scanned during the pump running time. If the pressure in the installation does not reach the specified value, the signal lamp 21, which does not go out after the end of the running time of the pump, signals a fault.

In practice, in the main field of application of the central lubricating installations described, i.e. when fitted in commercial vehicles, about 90% of all greasing cases occur in the temperature range from −10° to +75° C., whereas only 10% of greasing cases occur in the temperature range from −10° to −25° C. If one greasing operation per 8-hour shift and 2-shift operation as well as a hitherto normal pump running time of about 150 seconds, which also takes winter conditions into account, are assumed and if this pump running time for the temperature range from −10° to +75° C. is shortened by 80%, i.e. by an amount which has proved acceptable, the useful life of the pump can be roughly trebled, as the following calculation based on 200 working days and 440 greasing operations per year reveals:

---
Pump running time constant 150 seconds
440 × 150 = 66000 seconds = 18.3 hours/year.
Pump running time 10%-150 seconds; 90%-30 seconds
440 × 30 × 0.9 = 11880 seconds = 3.3 hours/year,
440 × 150 × 0.1 = 6600 seconds = 1.8 hours/year
5.1 hours/year.
---

Apart from the reduction in the total pump running time to about 30%, in the event of a pipe fracture, in 90% of all lubricating cases only 20% of the lubricating grease which in conventional installations would escape from the pipeline system would pass into the environment.

In order to ensure that pressure is applied to all lubricant distributors even at extremely low temperatures, the control device 15 is provided with two control members 26 and 27, of which the control member 26 reduces the speed if a certain starting current is not reached, and the control member 27 at the same time slightly increases the running time of the drive motor 3. The delivery flow of the pump 4 is reduced by the speed reduction. The result is a slower pressure build-up in the pipeline system of the installation, which pressure build-up takes into account the poorer penetration behaviour of the cold lubricating grease. This eliminates the risk, on the one hand, of pressure which signals satisfactory functioning of all lubricant distributors building up in the main pipeline section up to the pressure sensor 22 as a result of a high pipeline resistance and the inertia of the lubricant and, on the other hand, of lubricant passing prematurely back into the lubricant reservoir via the pressure limiting valve 14 as pressure increases further.

What is claimed:

1. Central lubricating installation, in particular for commercial vehicles, comprising a lubricant reservoir (1), a pump unit (2), a control device (15) controlling interval and running times of the pump unit (2), a pressure sensor (22) interacting with the control device (15) and monitoring the satisfactory operation of the installation, a pressure limiting valve (14), and also lubricant lines (5) through which lubricating grease can be delivered to lubricant distributors (6, 7) allocated to lubricating points (8–13) which are at different distances from the pump unit, characterized in that an ambient temperature sensor (23) is allocated to the control device (15), signals of which the ambient temperature sensor are used to change the running time of the pump unit (2) as a function of ambient temperature and of penetration behaviour of the lubricating grease by decreasing the running time as the ambient temperature increases.

2. Central lubricating installation according to claim 1, characterized in that the analogue signals supplied by the ambient temperature sensor (23) are fed after digitalization in an analogue-to-digital converter (24) to a microprocessor (17) in which, by comparison with data stored in a memory (25), the running time of the pump unit (2) is established as a function of the ambient temperature.

3. Central lubricating installation according to claim 1, characterized in that the running time of the pump unit (2) can be changed in increments.

4. Central lubricating installation according to claim 3, characterized in that the running time of the pump unit (2) can be changed in two increments, of which one covers a temperature range from about −10° to +75° C. and the other a temperature range from −10° to −25° C.

5. Central lubricating installation according to claim 1, characterized in that the control device (15) is provided with a control member (26) which, when subject to low ambient temperatures and a longer running time of the pump unit (2) resulting therefrom, reduces delivery flow of the pump (4).

6. Central lubricating installation according to claim 5, characterized in that, to reduce the delivery flow, the speed of the pump unit (2) is reduced.

7. Central lubricating installation according to claim 5, characterized in that the control device (15) is provided with a further control member (27) for additionally increasing the pump running time for the purpose of compensating for a reduced volume delivered by the pump (4) as a result of a reduction in the delivery flow of the pump (4) within a predetermined running time.

8. Central lubricating installation according to claim 2, characterized in that the control device (15) is provided with a control member (26) which, in the presence of low ambient temperatures and a longer running time of the pump unit (2) resulting therefrom, reduces delivery flow of the pump (4).

9. Central lubricating installation according to claim 8, characterized in that, to reduce the delivery flow, the speed of the pump unit (2) is reduced.

10. Central lubricating installation according to claim 8 characterized in that the control device (15) is provided with a further control member (27) for additionally increasing the pump running time for the purpose of compensating for a reduced volume delivered by the pump (4) as a result of a reduction in the delivery flow of the pump (4) within a predetermined running time.

* * * * *

UNITED STATES PATENT AND TRADEMARK OFFICE
CERTIFICATE OF CORRECTION

PATENT NO. : 4,967,881
DATED : November 6, 1990
INVENTOR(S) : Johannes Meuer et al.

It is certified that error appears in the above-identified patent and that said Letters Patent is hereby corrected as shown below:

COLUMN 4, Lines 54-55;
Claim 8, Lines 3 - 4: Delete "in the presence of" and substitute - -when subject to- -.

Signed and Sealed this

Tenth Day of March, 1992

Attest:

HARRY F. MANBECK, JR.

Attesting Officer

Commissioner of Patents and Trademarks